US009185585B2

(12) United States Patent
Goria et al.

(10) Patent No.: US 9,185,585 B2
(45) Date of Patent: Nov. 10, 2015

(54) METHOD AND SYSTEM FOR SIMULATING THE PHYSICAL LEVEL OF A RADIO NETWORK

(75) Inventors: Paolo Goria, Turin (IT); Davide Missan, Turin (IT); Stefano Macagno, Turin (IT); Alessandro Trogolo, Turin (IT)

(73) Assignee: Telecom Italia S.p.A., Milan (IT)

( * ) Notice: Subject to any disclaimer, the term of this patent is extended or adjusted under 35 U.S.C. 154(b) by 628 days.

(21) Appl. No.: 13/143,120

(22) PCT Filed: Dec. 31, 2008

(86) PCT No.: PCT/EP2008/068377
§ 371 (c)(1),
(2), (4) Date: Jul. 1, 2011

(87) PCT Pub. No.: WO2010/075899
PCT Pub. Date: Jul. 8, 2010

(65) Prior Publication Data
US 2011/0310745 A1    Dec. 22, 2011

(51) Int. Cl.
*H04W 24/06*    (2009.01)

(52) U.S. Cl.
CPC ..................... *H04W 24/06* (2013.01)

(58) Field of Classification Search
CPC .................................................. H04W 24/06
USPC ........................................................ 370/241
See application file for complete search history.

(56) References Cited

U.S. PATENT DOCUMENTS

| 2004/0014444 | A1* | 1/2004 | Ben Rached et al. | 455/135 |
| 2004/0179547 | A1* | 9/2004 | Kuffner et al. | 370/465 |
| 2007/0036088 | A1  | 2/2007 | Singh et al. | |
| 2007/0177569 | A1* | 8/2007 | Lundby | 370/349 |
| 2008/0137577 | A1* | 6/2008 | Habetha | 370/311 |

FOREIGN PATENT DOCUMENTS

WO    WO02/104055    * 12/2002    ............... H04Q 7/36

OTHER PUBLICATIONS

France Telecom R & D: "WCDMA-HSDPA System level simulator calibration" 3GPP Draft; R1-04-0499, 3rd Generation Partnership Project (3GPP), Mobile Competence Centre: 650 Route Des. Lucioles; F-06921 Sophia-Antipolis Cedex; France, vol. RAN WG1, no. Montreal Cananda; May 6, 2004, XP050098781; paragraph 1, 2.1. 2.4, 27, 4 and Fig. 2-1.

France Telelcom R & D: "OFDM and WCDMA system level simulator results" 3GPP Draft; R1-04-0501, 3rd Generation Partnership Project (3GPP), Mobile Competence Centre; 650, Route Des Lucioles; F-06921 Sophia-Antipolis Cedex; France, vol. RAN WG1, no. Montreal, Canada; May 6, 2004, XP050098783.

(Continued)

*Primary Examiner* — Huy D Vu
*Assistant Examiner* — Stephen J Clawson
(74) *Attorney, Agent, or Firm* — Banner & Witcoff, Ltd.

(57) ABSTRACT

A method of simulating transmission of data from a transmitter to a receiver in a radio communications network, the method including calculating an average amount of data to be transmitted to the receiver in a considered transmission time interval based on a relationship between an interferential condition assumed to be experienced at the receiver and a data transmission throughput, the relationship being determined by a link-level simulation of the link between the transmitter and the receiver.

15 Claims, 6 Drawing Sheets

(56) References Cited

OTHER PUBLICATIONS

Burger S et al; "Location Dependent CDMA Orthogonality in System Level Simulations", Vehicular Technology Conference, 2005. VTC 2005—Spring. 2005 IEEE 61st, 20050530-20050501 IEEE, Piscataway, NJ, USA, vol. 1, May 30, 2005, pp. 419-423 XP010855427.

Nortel Networks "Effective SIR Computation for WCDMA System-Level Simulations", 3GPP Draft; R10031299, 3rd Generation Partnership Project (3GPP), Mobile Competence Centre; 650, Route Des Lucioles; F-06921 Sophia-Antipolis Cedex; France, vol. RAN WG1, no. Lisbon, Portugal; Nov. 19, 2003, XP050098345.

Nortel Networks: "System-Level Simulation Methodology for the OFDM SI", 3GPP Draft; R1-031392, 3rd Generation Partnership Project (3GPP), Mobile Competence Centre; 650, Route Des Lucioles, F-06921 Sophia-Antipolis Cedex; France, vol. RAN WG1, no. Lisbon, Portugal; Dec. 1, 2003, XP050098428.

Seeger et al.—Institute of Electrical and Electronics Engineers: "Variable Orthogonality Factor: a Simple Level Interface between Link and System Level Simulation for High Speed Downlink Packet Access", Vehicular Technology Conference, 2003. VTC 2003—Fall 1002 IEEE 58th Orlando, FL, USA Oct. 6-9, 2003; Piscataway, NJ, USA, IEEE, US, vol. 4, Oct. 6, 2003, pp. 2531-2534, XP010701554.

International Search Report dated Oct. 13, 2009, in corresponding Application: PCT/EP2008/068377.

Written Opinion of the International Searching Authority dated Oct. 13, 2009, in corresponding Application: PCT/EP2008/068377.

H. Holma entitled "A Study of UMTS Terrestrial Radio Access Performance", presented at Helsinki University of Technology (Espoo, Finland) on Oct. 24, 2003, pp. 23-30.

S. Hamalainen, H. Holma, K. Sipila "Advanced WCDMA Radio Network Simulator", PIMRC'99—Osaka, Japan, Sep. 12-15, 1999, pp. 951-955.

J. Silva, N. Souto, A, Correia, F. Cercas, A. Rodrigues, "UMTS AWGN Simulation Results for Uplink, Downlink and HSDPA transmissions" Mobile Communications Summit, Aveiro, Portugal, Jun. 2003, vol. 1, pp. 543-547.

D. Molkdar, W. Featherstone, "System level performance evaluation of EGPRS in GSM macrocellular environments" VTC 2000, pp. 2653-2660.

\* cited by examiner

| | CQI 0 | CQI 1 | CQI 2 | CQI 3 | CQI 4 | CQI 5 | CQI 6 | CQI 7 | CQI 8 | CQI 9 | CQI 10 | CQI 11 | CQI 12 | CQI 13 | CQI 14 | CQI 15 |
|---|---|---|---|---|---|---|---|---|---|---|---|---|---|---|---|---|
| Category 1-6 | 0 | 5 | 5 | 5 | 5 | 5 | 5 | 5 | 5 | 5 | 5 | 5 | 5 | 5 | 5 | 5 |
| Category 7,8 | 0 | 5 | 5 | 5 | 5 | 5 | 5 | 5 | 5 | 5 | 5 | 5 | 5 | 5 | 5 | 5 |
| Category 9 | 0 | 5 | 5 | 5 | 5 | 5 | 5 | 5 | 5 | 5 | 5 | 5 | 5 | 5 | 5 | 5 |
| Category 10 | 0 | 5 | 5 | 5 | 5 | 5 | 5 | 5 | 5 | 5 | 5 | 5 | 5 | 5 | 5 | 5 |
| Category 11,12 | 0 | 5 | 5 | 5 | 5 | 5 | 5 | 5 | 5 | 5 | 5 | 5 | 5 | 5 | 5 | 5 |

| | CQI 16 | CQI 17 | CQI 18 | CQI 19 | CQI 20 | CQI 21 | CQI 22 | CQI 23 | CQI 24 | CQI 25 | CQI 26 | CQI 27 | CQI 28 | CQI 29 | CQI 30 |
|---|---|---|---|---|---|---|---|---|---|---|---|---|---|---|---|
| Category 1-6 | 5 | 5 | 5 | 5 | 5 | 5 | 5 | 5 | 5 | 5 | 5 | 5 | 5 | 5 | 5 |
| Category 7,8 | 5 | 5 | 5 | 5 | 5 | 5 | 5 | 5 | 5 | 5 | 7 | 8 | 10 | 10 | 10 |
| Category 9 | 5 | 5 | 5 | 5 | 5 | 5 | 5 | 5 | 5 | 5 | 7 | 8 | 10 | 12 | 12 |
| Category 10 | 5 | 5 | 5 | 5 | 5 | 5 | 5 | 5 | 5 | 5 | 7 | 8 | 10 | 12 | 15 |
| Category 11,12 | 5 | 5 | 5 | 5 | 5 | 5 | 5 | 5 | 5 | 5 | 5 | 5 | 5 | 5 | 5 | ized by a model of the communication channel that
METHOD AND SYSTEM FOR SIMULATING THE PHYSICAL LEVEL OF A RADIO NETWORK

CROSS REFERENCE TO RELATED APPLICATIONS

This is a U.S. National Phase Application under 35 U.S.C. §371 of International Application No. PCT/EP2008/068377, filed Dec. 31, 2008, which was published Under PCT Article 21(2), the entire contents of which are incorporated herein by reference.

BACKGROUND OF THE INVENTION

1. Field of the Invention

The present invention generally relates to the field of telecommunications, and more specifically to methods and systems for the simulation of radio telecommunication networks like cellular and wireless networks. In particular, the simulation of the physical level of a radio network is considered.

2. Discussion of the Related Art

In the field of telecommunications and, in particular, of radio telecommunication networks like cellular networks (e.g., mobile telephony networks) and wireless networks (e.g., WiMax networks), simulation tools are for example used to define the network architecture before the deployment, and, after the network deployment, to assess the network compliance with desired traffic/service handling capabilities, in order for example to upgrade the already deployed network.

Radio telecommunication networks are complex systems that cannot in general be analytically modeled by means of mathematical equations.

Two approaches are known in the art for simulating the behavior of a complex system like a radio network: a dynamic approach and a static, or "MonteCarlo" approach.

In the dynamic approach, the evolution in time of the system is taken into consideration, and the changes of state of the system occur as a consequence of events. The generic event represents the occurrence of a condition that causes the system state to change. By performing a simulation that takes into consideration the evolution of the system state over a certain time period, it is possible to gain an overall evaluation of the system behavior.

In the static approach, the evolution in time is not considered, and the analysis is conducted in respect of a certain condition of the system; in other words, a snapshot of the system at a certain time instant is taken. An overall evaluation of the system behavior can in this case be gained by taking different snapshots of the system, at different time instants.

Dynamic simulators are generally significantly more complex than MonteCarlo simulators, thus MonteCarlo simulations take less time and need less computing resources.

Both dynamic and static approaches can be used to simulate radio telecommunication networks, the choice depending on the type of analysis which is desired to be performed. If the interest is on the network parameters that are related to time, like for example the time required to set up a call, dynamic simulations are conducted; if instead the interest is on network parameters that are not related to time, e.g. the interferential state experienced at a receiver, albeit dynamic simulations might in principle be used, static simulations are preferred because they are faster.

As discussed in the Dissertation for the degree of Doctor of Technology presented by H. Holma entitled "A STUDY OF UMTS TERRESTRIAL RADIO ACCESS PERFORMANCE", presented at Helsinki University of Technology (Espoo, Finland) on the 24th of Oct., 2003, pages 23-30 the simulators for cellular and wireless networks can be classified as belonging to two broad families: link-level simulators and system-level simulators. Link-level simulators consider a single radio link between the transmitter and the receiver, and analyze in detail the physical-level performance of the considered transmission system. System-level simulators analyze the behavior of a set of base radio stations of the network and of user terminals in a considered geographic area, and take into consideration phenomena like the traffic, the interferential situation and the radio resources management.

Typically, system-level simulators exploit models of the physical level of the system to be simulated which are based on the results obtained by running link-level simulators. As discussed in the cited Dissertation by Holma, and in S. Hämäläinen, H. Holma, K. Sipilä "ADVANCED WCDMA RADIO NETWORK SIMULATOR", PIMRC'99—Osaka, Japan, 12-15 Sep. 1999, pages 951-955, link-level simulators may for example provide, as a result of the simulation, curves that give a relation between the physical-level performance and the estimated interferential conditions experienced; the considered performance may relate to the data loss rate (e.g., the BLER—BLock Erasure Rate—or the FER—Frame Error Rate—or the PER—Packet Error Rate) as a function of the SNR (Signal to Noise Ratio, which may be expressed as Eb/N0, the ratio of the energy per bit to noise power spectral density). Other examples are provided in N. Souto et al., "UMTS AWGN Simulation Results for Uplink, Downlink and HSDPA transmissions" Mobile Communications Summit, Aveiro, Portugal, June, 2003, Vol. 1, pages 543-547.

System-level simulators model the transmission of multiple data packets; as discussed in D. Molkdar, W. Featherstone, "System level performance evaluation of EGPRS in GSM macro-cellular environments" VTC 2000, pages 2653-2660, for each transmission the following check is performed: the SNR, or Eb/N0, is calculated; using a curve obtained by running a link-level simulator, the average loss rate is determined which corresponds to a measured SNR or Eb/No value; a random number with uniform distribution between 0 and 1 is extracted, and if such a random number is less than the average loss rate determined above, the data packet is considered lost, otherwise it is considered correctly received.

US 2007/036088 discloses simulation models of media access control and physical layer characteristics that facilitate the simulation/emulation of a variety of phenomena that affect transmissions via a wireless media. Such phenomena include media access contention delays, packet drops, and retransmissions that are generally dependent upon changes in transmitter/receiver locations. Each wireless environment is characterized by a model of the communication channel that characterizes transmission effects based on the number of competing transmitters in the environment, which is dynamically determined based on the location of each node in the environment. Additionally, the location of nodes is used to simulate the effects of 'hidden nodes', nodes that are unknown to a transmitting node but can interfere with the reception of transmissions at a receiving node. Each device/node model in the wireless environment preferably accesses the same model of the communication channel, thereby minimizing the amount of detail required at each device model.

SUMMARY OF THE INVENTION

The Applicant has observed that the way system simulators known in the art work is hardly applicable to cellular and wireless networks in which the data packet transmissions are correlated to one another, like in the case of EGPRS (Enhanced GPRS), HSDPA (High Speed Downlink Access) and HSUPA (High Speed Uplink Packet Access). In these telecommunication systems, HARQ (Hybrid Automatic Retransmission Request) retransmission techniques are implemented, which are based on the storage, at the receiver, of the received data in case of an unsuccessful transmission; during the following retransmission(s), the stored data are exploited to increase the probability of successful reception of the transmitted data. Additionally, such systems may change the transport format used in different transmissions, depending on the transmission quality. In these systems, the receiver has to be capable of correlating multiple successive transmissions.

Due to these peculiarities, in order to properly model the physical level of these telecommunication systems in a simulation thereof, it would be necessary to store past transmissions and correlate them to successive retransmissions. While in a link-level simulator this behavior is of relatively easy implementation, this is not the case of a system-level simulator, because the curves that link the loss rate to the interferential measures do not contain the information required to take into account the storage of data at the receiver, the correlation between successive transmissions and the possibility of change of the transport format.

Thus, for telecommunication systems that adopt modern transmission techniques like EGPRS, HSDPA and HSUPA it is very difficult to model the physical level adopting the simulation techniques known in the art.

The Applicant has tackled the problem of devising a way adapted to simulate, at the system level, also telecommunication systems of the above-mentioned type, which is not too heavy from the computational viewpoint, and takes reasonable time.

The Applicant has found that the physical level of telecommunication systems that adopt modern transmission techniques like EGPRS, HSDPA and HSUPA can be simulated, even at a system level, by exploiting relationships (in the form of curves or "link-level curves") between the average throughput and interferential measures, and that are obtained by running link-level simulators. In the system-level simulator, the experienced interferential conditions (e.g., the SNR) are estimated before the simulated transmission of data. For the simulation of the data transmission, it is assumed to transmit an amount of data equivalent to the average throughput corresponding to the estimated interferential conditions; a loss-free transmission is considered, taking into account all the factors already considered in the link-level curve(s), like the HARQ retransmissions and the change of transport format; at the receiver, no check is made of the losses, because the latter are already taken into account in the equivalent amount of data assumed to be transmitted for the simulation purposes.

The solution according to the present invention allows reducing the simulation time, and can be applied in general to the simulation of the physical level of any radio telecommunication system.

According to an aspect of the present invention, there is provided a method of simulating transmission of data from a transmitter to a receiver in a radio communications network, the method comprising calculating an average amount of data to be transmitted to the receiver in a considered transmission time interval based on a relationship between an interferential condition assumed to be experienced at the receiver and a data transmission throughput, said relationship being determined by means of a link-level simulation of the link between the transmitter and the receiver.

Said interferential condition may be estimated in a transmission time interval preceding the considered transmission time interval.

A transmission power available for transmission at the transmitter may be determined, and said estimated interferential condition and the determined transmission power may be used to calculate a SNR or an Ec/N0 experienced at the receiver.

A number of transmission channels exploitable for transmitting data from the transmitter to the receiver may be determined, and, based on the determined number of transmission channels, one curve among a family of curves linking the SNR or the Ec/N0 experienced at the receiver to the throughput may be selected, said curves being determined by means of the link-level simulation of the link between the transmitter and the receiver.

The throughput may be derived based on the selected curve and the calculated SNR or Ec/N0 experienced at the receiver.

The derived throughput may be used to calculate the average amount of data to be transmitted to the receiver in the considered transmission time interval.

A packet data unit to be transmitted in the considered transmission time interval may be composed, said packet data unit containing the calculated average amount of data.

According to another aspect of the present invention, a system for simulating transmission of data from a transmitter to a receiver in a radio communications network, the system comprising a data processing system operable to perform the above method.

According to still another aspect of the present invention, a computer program is provided adapted to be loaded in a data processing system and comprising computer program modules operable to implement the above method when the program is executed by the data processing system.

BRIEF DESCRIPTION OF THE DRAWINGS

These and other features and advantages of the present invention will be best understood reading the following detailed description of some exemplary and non-limitative embodiments thereof; the following description should be read making reference to the attached drawings, wherein.

DETAILED DESCRIPTION OF EXEMPLARY INVENTION EMBODIMENTS

In the following, the present invention will be described making exemplary reference to the case of HSDPA and HSUPA systems. It is pointed out that these are mere examples and that the applicability of the present invention is not so limited.

The case of HSDPA will be considered first.

As known in the art, HSDPA is a radio access technology featuring an adaptation of the data transmissions to the instantaneous transmission channel conditions (expressed as SNR experienced at the receiver), which is accomplished by selecting suitable modulation and data coding formats through AMC (Adaptive Modulation and Coding) algorithms. The AMC algorithms aim at contrasting radio channel degradation phenomena due for example to multipath propagation (fast fading), and operate with a rather fine time resolution, equal to the TTI (Transmission Time Interval), which in HSDPA is equal to 2 ms. Additionally, HARQ is implemented at the MAC (Media Access Control) level, for accomplishing retransmissions of data packets in case errors are experienced at the receiver. The HARQ functionality operates according to the "N-process HARQ", providing for the parallel management of a plurality of N transmission processes of the SAW (Stop And Wait) type, and the transmission in sequence of a certain number of data packets (typically 6, for the HSDPA, with TTI of 2 ms), waiting for acknowledgements from the receiver. In case a data packet is not correctly received, the erroneously received data packet is stored at the receiver, and the stored data packet is combined with (a) successively retransmitted data packet(s), in order to increase the probability of success of the data decoding by exploiting pieces of information that were correctly received at the first (or previous) transmission(s).

The HS-DSCH (High-Speed Downlink Shared CHannel) transport channel used by HSDPA is transmitted over a certain number of physical channels called HS-PDSCH (High-Speed Physical Downlink Shared CHannel), each of which corresponds to a respective orthogonal spreading code. At the MAC level, a data packet (a so-called MAChs PDU—Packet Data Unit) of a certain size (TBsize), calculated by the AMC algorithm, is fragmented over the different HS-PDSCH channels and transmitted in parallel over them, complying with the modulation and coding rules of the physical level. The generic MAChs PDU is composed of packets at a higher level (MAC PDU) and possibly of padding elements, used to fill the selected MAChs PDU size TBsize; the MAC PDUs are not fragmented.

Figure 1:
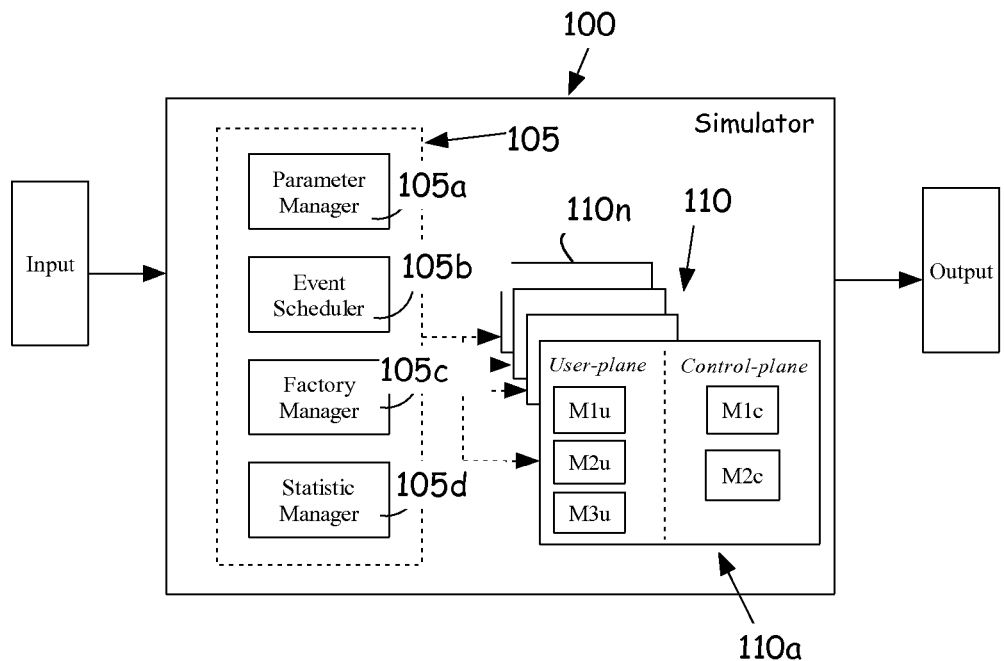
FIG. 1 schematically shows, in terms of functional blocks, the structure of a simulator according to an embodiment of the present invention.

FIG. 1 is a schematic block diagram showing the architecture of a simulator according to an embodiment of the present invention. The simulator, globally denoted 100, is an object-based system-level simulator and comprises a simulation engine 105, that manages the progress of the simulation; the simulation engine comprises several modules, such as a parameter manager module 105a, an event scheduler module 105b, a factory manager module 105c, and a statistic manager module 105d. A similar simulator is described in the International application No. WO 02/104055 in the name of the present Applicant, which is incorporated herein by reference. The event scheduler module 105b is the object that manages the time evolution of the system to be simulated. The statistic manager module 105d manages statistics from the different objects of the simulator (initialization, transient, writing to file). The parameter manager module 105a is a parser capable of reading from a text file (written in a suitable format) all the configuration parameters related to the various objects to be simulated; each object requests to the parameter manager module the values of the parameters it needs. The factory manager module 105c manages the allocation of the memory for the simulation (allocation/deallocation of memory areas representing the logical objects to be simulated). The simulator 100 also comprises a device package 110, including a plurality of devices 110a, . . . , 110n, each device representing a physical device of the telecommunication network to be simulated (e.g. mobile terminals, base stations—BTS, NodeB—base station controllers—BSC, RNC—, switching centrals—MSC—GPRS nodes like SGSN, GGSN, etc.); each device 110a, . . . , 110n comprises several modules, corresponding to the functionalities and the different protocols managed by the corresponding physical device.

According to an embodiment of the present invention, in order to simulate at the system level an HSDPA network, the MAChs (high-speed MAC protocol) level is modified in its part implementing HARQ, and the physical level is simplified by exploiting link-level curves for modeling the reception of data packets as a function of the estimated SNR. The system-level simulator exploits such link-level curves, that correlate the throughput to the estimated SNR, and which take into account the effects of HARQ retransmissions, so that these effects need not be modeled in the simulator; families of such curves are used, corresponding to different transport formats.

Essentially, the simulator according to the herein described embodiment of the present invention operates according to two main phases.

Let TTIn be the n-th transmission time interval in which a data packet is simulated to be transmitted.

In a first phase, the interference in downlink is estimated; the estimation of the interference is made at the end of the preceding transmission time interval TTI(n−1), during which the transmission of the previous data packet has been simulated; the interference is calculated as the sum of all the non-HSDPA channels.

In a second phase, a scheduling of the transmissions to the users which have to receive data packets in the transmission time interval TTIn is performed; for each user to which data packets have to be transmitted, the MAChs-PDU, i.e. the data packet to be transmitted at the physical level, is composed, and then the transmission thereof is simulated.

Figure 2:
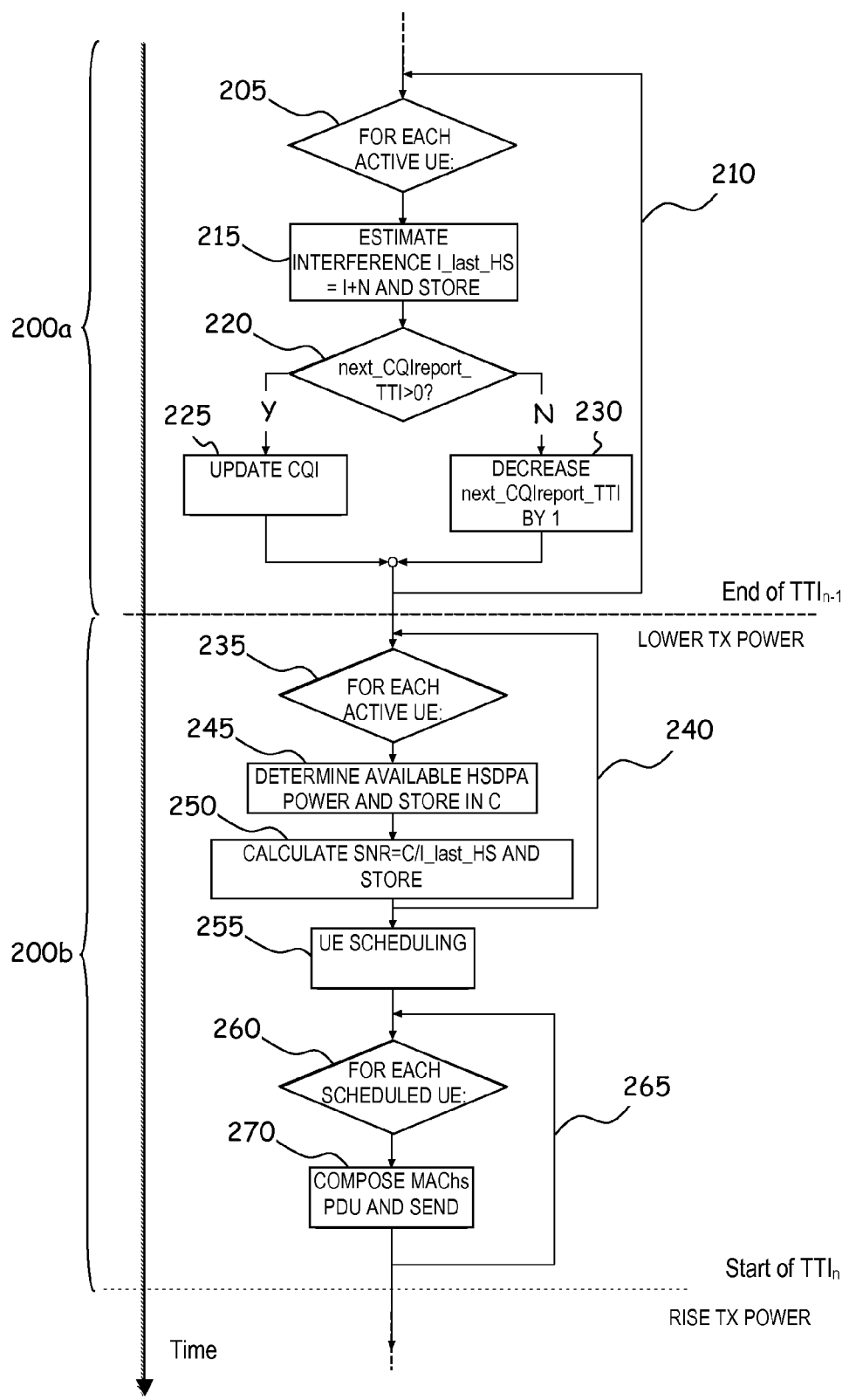
FIG. 2 is a schematic flowchart of a simulation method according to an embodiment of the present invention.

FIG. 2 is a schematic flowchart showing in greater detail the operation of the simulator according to an embodiment of the present invention.

The two main phases outlined above are respectively denoted 200a and 200b.

In the first phase 200a, before the end of the preceding transmission time interval TTI(n−1), a loop is entered in which, for every User Equipment (UE) that is assumed to be active (block 205 and arrow 210), the interference in downlink experienced by the considered UE is estimated and stored (block 215). In particular, the interference estimation is made taking into account all the contributions due to inter-cell interference, i.e. interference caused by network cells adjacent to the serving network cell in which the considered UE is assumed to be located, the contributions due to the intra-cell interference generated by all the channels transmitted in downlink by the serving network cell, the thermal noise, and effects of shadowing, fast-fading and propagation attenuation, which are typical of a radio channel in a mobile communications network. The estimated interference will be used in the next transmission time interval TTIn; the interference experienced by the generic active UE is estimated at the end of the transmission time interval TTI(n−1) preceding that in which it is used because for taking into account the inter-cell interference all the cells adjacent to the serving cells need to be simulated as transmitting.

Then, it is ascertained whether the next transmission time interval TTIn is a reporting TTI (block 220), i.e. a TTI in which the UE reports to the network the measured CQI (Channel Quality Indicator); the CQI is an indicator of the channel quality as perceived and measured by the UE; it is expressed as an integer in the range from 0 to 30, the higher the number the better the channel quality; in the affirmative case (exit branch Y of block 220), the previously stored CQI is updated (block 225), otherwise (exit branch N of block 220), a counter used for keeping track of whether the next TTI is a reporting TTI is updated (block 230). An exemplary algorithm for updating the CQI will be described later.

In the second phase 200b, at the beginning of the transmission time interval TTIn, another loop similar to the preceding one is entered in which, for every UE that is assumed to be active (block 235 and arrow 240), the power available for the HSDPA transmission to the considered UE is calculated and stored (block 245). The SNR assumed to be experienced by that UE is then calculated, exploiting the previously calculated and stored interference value (block 250); in particular, the SNR is calculated as the ratio between the calculated power available for transmission and the previously calculated interference.

A scheduling of the transmissions to the UEs which have to receive data packets in the transmission time interval TTIn is then performed (block 255). An exemplary scheduling algorithm will be described later.

Then, for each UE for which transmission has been scheduled (loop 260 and 265), the MAChs PDUs are composed and transmitted (block 270), as described in detail later.

According to an embodiment of the present invention, the CQI is used (as discussed later) to determine the number of spreading codes, i.e. the number of physical HS-PDSCH channels to be assigned by the transmitter to the considered UE for transmitting thereto data in the considered TTI. Based on the determined number of spreading codes, a selection is made of the link-level curve(s) that provides the throughput as a function of the interference; the selected link-level curve(s) are used to calculate the amount of bits to be included in the data packet to be transmitted, as discussed in greater detail later.

Figure 3:
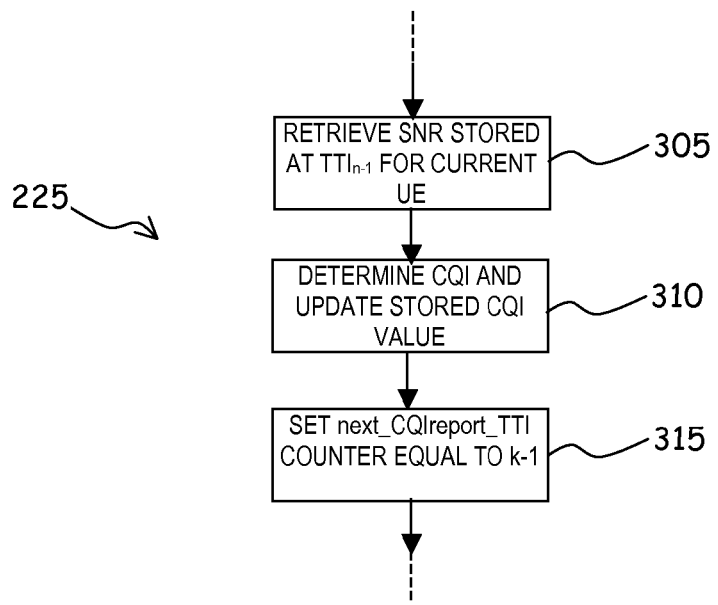
FIG. 3 is a schematic flowchart of a CQI update procedure in the method of FIG. 2, according to an embodiment of the present invention.

An exemplary algorithm according to an embodiment of the present invention for updating the CQI (block 220 in FIG. 2) is depicted in the flowchart of FIG. 3 and will be now described. In order to update the CQI, the SNR value stored for the considered UE (which has been calculated at the beginning of the transmission time interval TTI(n−1)) is retrieved (block 305). Exploiting the SNR value, the updated value of the CQI is calculated (block 310); for example, a curve providing a relationship between the experienced SNR and the CQI may be used to calculate the CQI based on the SNR. Then the counter used for keeping track of whether a TTI is a reporting TTI is reset (block 315). At the first run of the simulator, the value of the counter is for example set using a configuration parameter, stored for example in a configuration file.

Concerning the calculation of the SNR experienced by the generic UE (block 250), it is calculated as the ratio C// between the transmission power over the HS-DSCH channel at the physical level and the sum of all the interferential contributions from the other channels of the serving cell (intra-cell interference) and of the adjacent cells (inter-cell interference), plus the thermal noise. The HSDPA transmission power is determined as described above (block 245); the value of the interference used for calculating the SNR in the transmission time interval TTIn is that calculated at the end of the preceding transmission time interval TTI(n−1) (block 215).

Figures 4, 5:
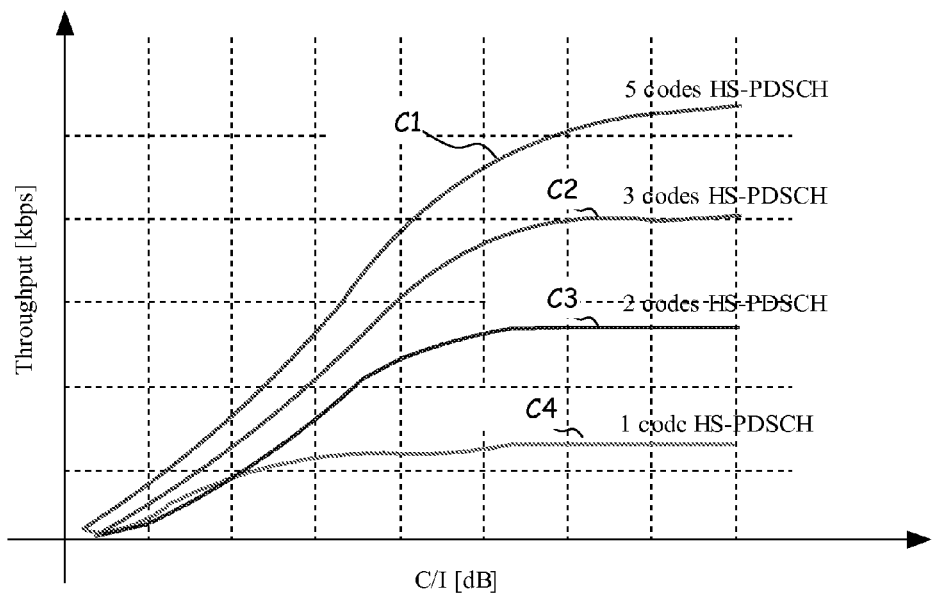
FIG. 4 is a diagram depicting exemplary curves obtained by running a link-level simulator and establishing a relationship between a SNR assumed to be experienced at the receiver and the data transmission throughput.
FIG. 5 shows tables providing the number of spreading codes that are supported by a receiver depending on the receiver category and the CQI.

Using link-level curves obtained from a link-level simulator, based on the calculated SNR (or C//), the throughput, i.e. the amount of data that can be transmitted to the UE experiencing that SNR is derived. FIG. 4 is a diagram showing an exemplary family of such curves; the C// (for example, in dB) is put in abscissa, and the throughput (e.g., in kbps) is reported in ordinate. Four exemplary curves C1, C2, C3 and C4 are shown; each curve relates to the use of a respective number of spreading codes (i.e., a respective number of HS-PDSCH channels) for the transmission of the data in parallel; for example, curve C1 corresponds to 5 spreading codes (i.e., 5 HS-PDSCH channels), curve C2 corresponds to 3 spreading codes, curve C3 corresponds to 2 spreading codes, and curve C1 corresponds to 1 spreading code. The curves C1-C4 are obtained by running a link-level simulator, simulating various transport formats that can be mapped onto respective numbers of spreading codes; in particular, the curves depicted in the figure have been obtained by setting in the link-level simulator the transport formats (number of spreading codes, size of the transport block and modulation) for the 30 different CQI values defined in the 3GPPP Technical Specification (TS) 25.214 for the different categories of UE; FIG. 5 shows tables for determining the maximum number of spreading codes usable for a UE as a function of the CQI value and of the category of the UE, in compliance with the 3GPPP TS 25.214. The category of the UE is for example specified as a configuration parameter stored in a configuration file for the system-level simulator.

In particular, the link-level simulator estimates, for the different values of SNR, the BLER corresponding to the used transport formats, counting the number of errors in the received data packets; from the BLER, the throughput can be derived, taking into account the time required to transmit the amount of data corresponding to the transport format, as follows:

$$\text{Throughput} = \frac{TBSize}{Time}$$

where TBSize is the size of transported data block, i.e. of the MAChs PDU, and Time is the time required to transmit the data block. The link-level simulator is capable of modeling the HARQ retransmission, as well as the demodulation and decoding at the physical level; thus, the transmission time Time estimated by the link-level simulator takes into account any possible retransmission of data; in particular, the transmission time Time is equal to 2 ms for the HSDPA if the reception is free of errors from the very first time, and increases in case of errors at the receiver, so as to include the delay due to the necessity of retransmitting the MAChs PDU. The necessity of retransmissions thus lengthen the transmission time Time, and therefore reduces the throughput. An example of link-level simulator capable of performing the described operations is provided in H. Homa and A. Toskala, "HSDPA/HSUPA for UMTS: High Speed Radio Access for Mobile Communications", Wiley, 2006, page 130, FIG. 7.5.

It is observed that the approximation inherent to the fact that the SNR value used for calculating the amount of data to be transmitted to the UE in the transmission time interval TTIn is that calculated in respect of the situation in the preceding transmission time interval TTI(n−1) (i.e., considering the transmission power in the preceding TTI) can be considered acceptable and of minimal impact in the simulation of the system.

Figure 6:
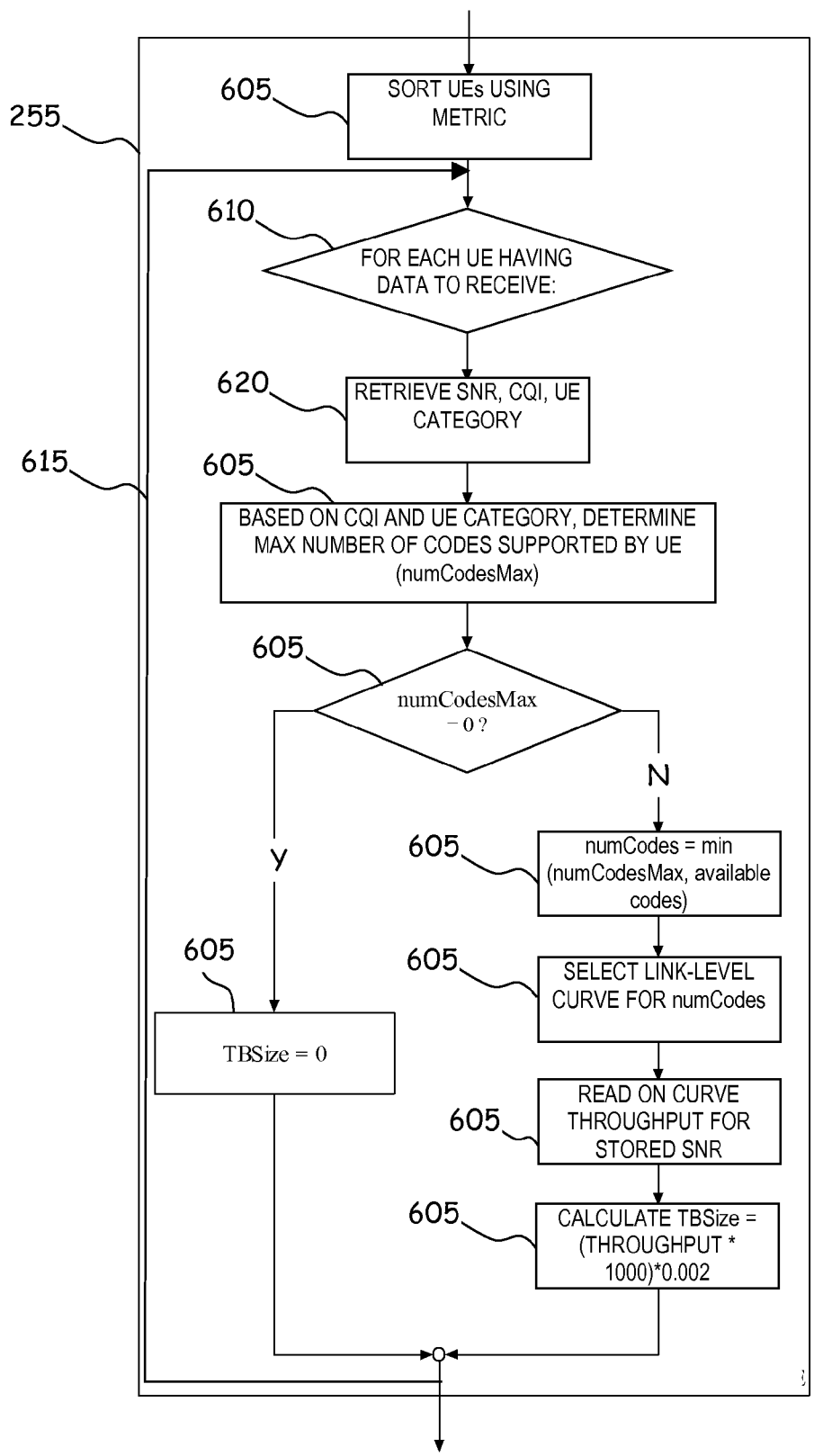
FIG. 6 is a schematic flowchart of a procedure for scheduling transmission to the receivers of the method of FIG. 2, in an embodiment of the present invention.

An exemplary algorithm for scheduling the transmissions to the UEs which have to receive data packets in the transmission time interval TTIn (block 255) is depicted in the flowchart of FIG. 6, and will be now described.

The transmission scheduling has the purpose of selecting, exploiting suitable metrics, which and how many UEs will receive data in the considered TTI. Making reference to FIG. 6, the active UEs are sorted in an order that depends on the specific metric used (block 605); for example, the UEs can be sorted in order of descending CQI, or according to a RoundRobin technique, or a proportional fare technique. The specific metric used for sorting the active UEs is not a limitation for the present invention. Then, a loop is entered (block 610 and arrow 615) in which, for each active UE to which data are to be transmitted, and according to the order established in block 605, the following operations are performed.

The SNR calculated in block 250, the stored CQI for that UE and the UE category are retrieved (block 620).

Based on the CQI and on the UE category, the maximum number of spreading codes that the UE can support is determined (block 625), based for example on tables like those shown in FIG. 5.

If the maximum number of supported spreading codes is 0 (block 630, exit branch Y), the value of TBSize is set equal to 0 (indeed, a UE that supports no spreading codes cannot receive data); if instead the maximum number of supported spreading codes is different from 0 (block 630, exit branch N), the number of spreading codes that can be assigned to the transmission of data to that UE is set equal to the minimum between the maximum number of spreading codes supported by that UE and the number of spreading codes still available at the transmitter (block 635), which depends on the actual availability of spreading codes in the considered network cell based on the radio resource management policy adopted. Based on the number of spreading codes thus calculated, one of the curves depicted for example in FIG. 4 is selected (block 640); for example, if the number of spreading codes that can be assigned to the considered UE is equal to 3, the curve C2 of FIG. 4 is selected. Using the selected curve, the throughput corresponding to the previously estimated SNR is determined (block 645); then, the value of TBSize is calculated (block 650) as:

TBsize=(Throughput*1000)*0.002Bytes.

where the multiplication factor 1000 depends on the fact that it has been assumed that the throughput is expressed in kbps, and the multiplication factor 0.002 is the duration of the TTI in seconds (the TTI is equal to 2 ms for the HSDPA). The calculated value of TBSize is the average amount of data that can be transmitted to the considered UE in the considered TTI, taking into account the experienced interferential conditions and the HARQ retransmissions.

Figure 7:
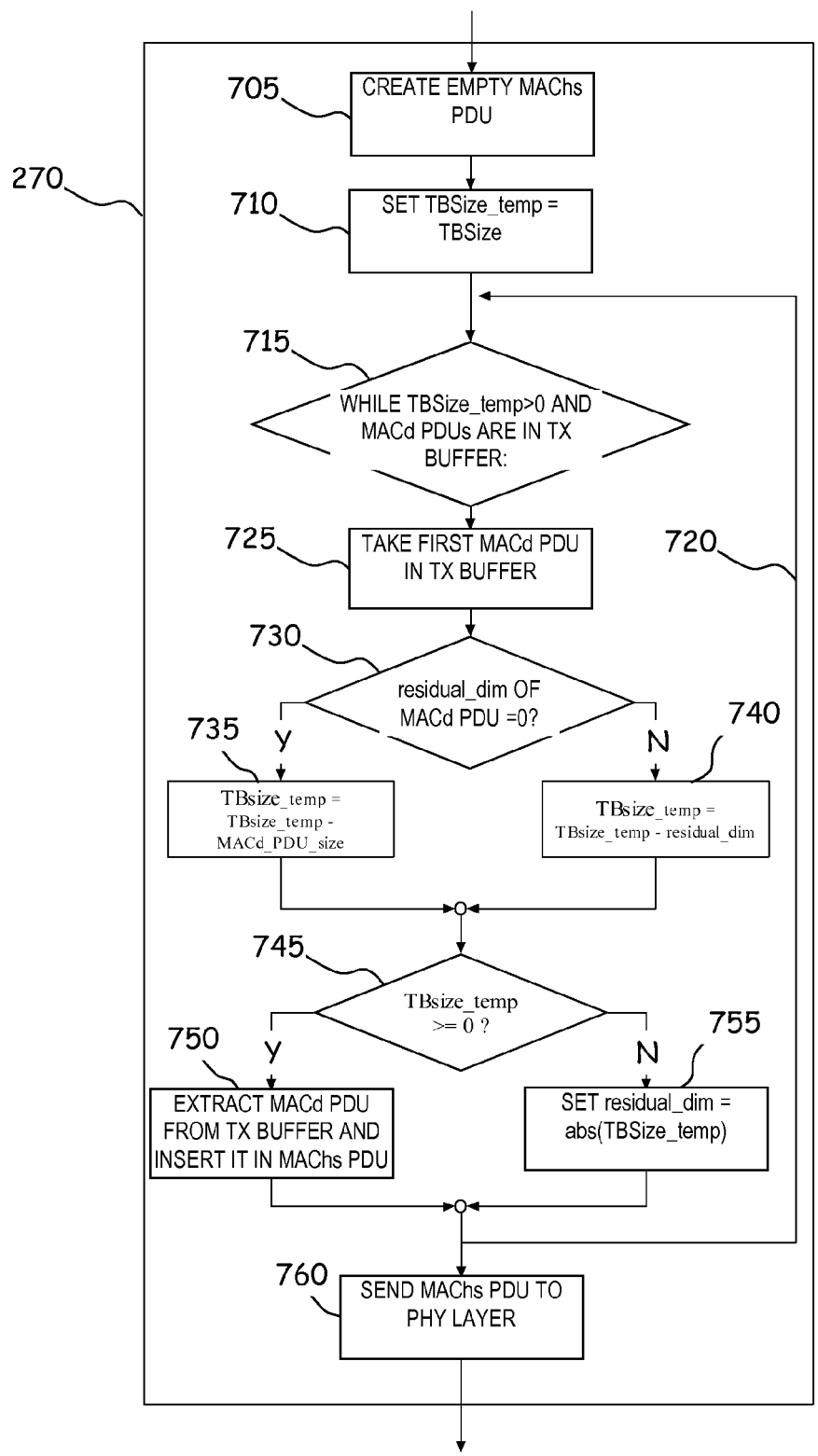
FIG. 7 is a schematic flowchart of a procedure for composing MAChs PDUs to be transmitted to the receivers, according to an embodiment of the present invention.

Once the average value of the amount of data that can be transmitted in the considered TTI to the considered UE has been determined, the MAChs PDU is composed, and transmitted (block 270). An exemplary algorithm for simulating the composition and transmission to the generic UE of the respective MAChs PDU is depicted in FIG. 7, and will be now described.

The MAChs PDU to be transmitted in the considered TTI to the considered UE is composed by taking a certain number of higher-level PDUs (MACd PDUs) which are waiting to be transmitted (in the transmission buffers). The size of the MAChs PDU is set equal to TBSize; since the number of bytes TBSize to be transmitted is, in the long run, an average value that takes into account possible retransmissions (and thus it represents an average physical-level throughput that the UE will experience in the estimated interferential conditions), for the composition of the MAChs PDU the MACd PDUs waiting to be transmitted shall in general be fragmented.

Firstly, an empty MAChs PDU is created (block 705). A temporary variable TBSize_temp is defined, and its value is initially set equal to the calculated value of TBSize (block 710).

A loop is then entered (block 715 and arrow 720) in which, while the value of the temporary variable TBSize_temp is higher than 0 and there are still MACd PDUs waiting to be transmitted in the transmission buffer, the following operations are performed.

The first MACd PDU waiting to be transmitted is taken from the transmission buffer (block 725). The residual size of the MACd PDU taken from the buffer is checked (block 730); each MACd PDU has associated therewith a variable (residual MACd PDU size) that defines the residual amount of MACd PDU data still to be transmitted; the residual MACd PDU size corresponds to the dimension of a portion of the MACd PDU that has been fragmented in the process of composition of the MAChs PDU and that still waits to be transmitted. If the residual MACd PDU size is 0 (exit branch Y of block 730), the value of the temporary variable TBSize_temp is decreased of the value of the MACd PDU size (block 735), whereas if the residual size is not 0 (exit branch N of block 730), the value of the temporary variable TBSize_temp is decreased of the value of the residual MACd PDU size (block 740).

The value of the temporary variable TBSize_temp is then assessed (block 745); if the value of TBSize_temp is greater than or equal to 0 (exit branch Y of block 745), the MACd PDU is removed from the transmission buffer and inserted in the MACs PDU that is being composed (750). If on the contrary the value of TBSize_temp is less than 0 (exit branch N of block 745), the value of the residual size of the MACd PDU considered is set equal to the absolute value of TBSize_temp (block 755).

Once the loop (block 715 and arrow 720) is exited, the MAChs PDU is sent to the physical level for being transmitted to the UE (block 760).

It can be appreciated that the generic MACd PDU waiting to be transmitted is removed from the transmission buffer only when the last fragment thereof has been inserted into a MAChs PDU; in this way, the actual time required for transmitting a MACd PDU taking into account possible retransmissions is properly simulated. It may happen (depending on the simulated channel conditions) that the calculated value of TBSize is so small that the MAChs PDU cannot contain even one full MACd PDU, thus a MACd PDU may need several TTIs for being fully received at the UE, because in each TTI only a fragment of the MACd PDU is transmitted; this on average emulates the transmission delay that, in the real network, is introduced by HARQ retransmissions.

Up to now, the exemplary case of HSDPA has been considered; hereinafter, an embodiment of the present invention applicable to HSUPA will be described.

In HSUPA, the uplink transmission mechanism is similar to the downlink transmission mechanism of HSDPA, i.e. HARQ retransmissions are envisaged, and there is a multiplicity of possible transmission formats (i.e., different values of TBSize) that the UE can use for transmitting data. Differently from HSDPA, however, the choice of the value of TBSize does not depend on the channel conditions, but on the available power for transmission over the E-DCH (Enhanced uplink Dedicated Channel) channel, on the maximum transmission power assigned to the UE by the scheduler in the base station (Node-B) for the transmission over the E-DCH channel, and on the amount of data waiting to be transmitted in the transmission buffer.

Figure 8:
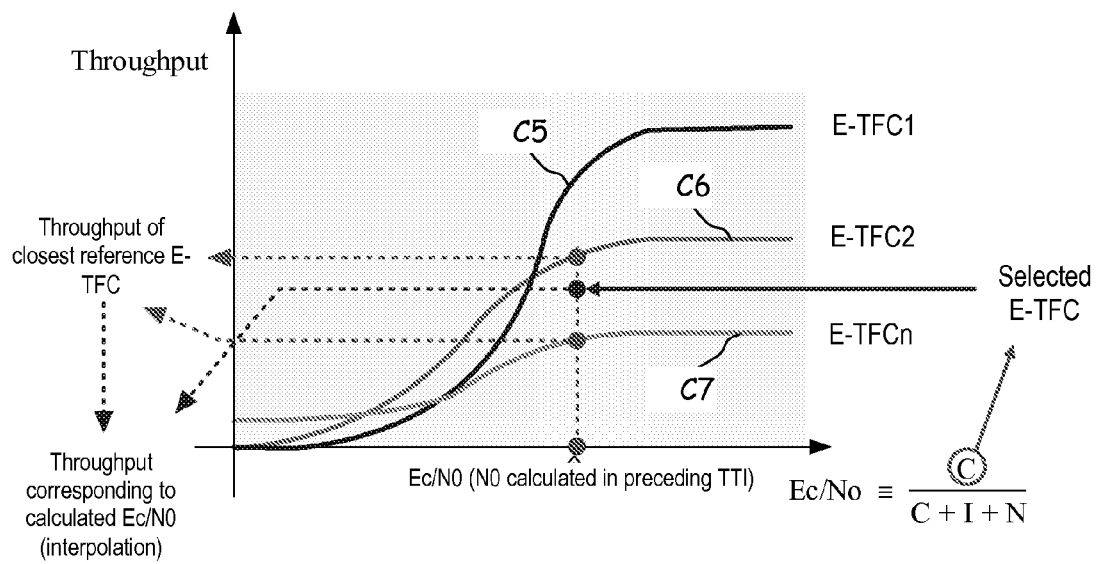
FIG. 8 is a diagram depicting exemplary curves obtained by running a link-level simulator and establishing a relationship between an Ec/N0 assumed to be experienced at the receiver and the data transmission throughput.

In particular, in HSUPA networks the UE receives, from a scheduler in the Node-B, a "grant" that specifies a maximum power ("power offset") that the UE will be allowed to use for transmitting the data over the E-DPCH (Enhanced Dedicated Physical Channel) physical channel, over which the E-DCH channel is transmitted. Combining the specified maximum power with the residual uplink transmission power available at the UE, the UE determines the effective maximum power with which the transmission will be performed, and, from this maximum power, the UE determines the transmission format E-TFC (Enhanced Transport Format Combination) for sending the data in a TTI. In the simulator, similarly to what described in connection with HSDPA, the selection of the transmission format adopted by the UE is made by exploiting link-level simulator curves; in link-level simulators, a certain number of reference curves, typically 8 curves, related to so-called "reference E-TFCs" are available, which are used to interpolate the curves corresponding to the other transport formats that can be used by the UEs in the system simulator (H. Homa and A. Toskala, "HSDPA/HSUPA for UMTS: High Speed Radio Access for Mobile Communications", Wiley, 2006, page 170, FIG. 8.1). FIG. 8 is a diagram reporting three exemplary reference curves C5, C6, C7; similarly to the diagram of FIG. 4, in ordinate there is the throughput, whereas in abscissa the value of Ec/N0 is reported, because in the simulation of HSUPA this is the quantity used for estimating the throughput. Ec/N0 is defined as the ratio between the total useful power received by the Node-B receiver from the UE to the total wide-band power (RTWP—Received Total Wide-band Power) received by the Node-B receiver, which is the sum of the total useful power received from the considered UE, the interferential power received from the other UEs (either connected to the same serving cell or to adjacent cells), and thermal noise. Similarly to what described for the HSDPA case, the Ec/N0 is calculated at the end of the TTI preceding the TTI in which the transmission has to be simulated.

Known the Ec/N0 and the power offset (extracted from the grant sent by the Node-B scheduler), the UE determines the transmission format, and thus the value of TBSize, as follows.

The power offset calculated based on the grant sent by the Node-B scheduler is compared to the power offsets of the reference E-TFC channels (these power offsets are signalled by the network to the UE at the connection setup), and the power offsets of the two closest reference power offsets (curves immediately above and below the Ec/N0 value) are determined. Then, exploiting the curves provided by the link-level simulator, the reference throughput obtainable with the two reference E-TFC channels thus determined at the calculated Ec/N0 are derived. The throughput obtainable with the available power offset is calculated as the ratio of the two reference throughputs.

Then, like in the HSDPA case, by multiplying the calculated throughput by the TTI duration (from 2 ms to 10 ms in HSUPA), the transport block size TBS, i.e. the size of the MACe-PDU to be transmitted is calculated.

Differently from the downlink transmission in HSDPA, HSUPA envisages, for the uplink transmission, a soft-handover scheme according to which the generic UE may send a same data packet to more than one receiver (belonging to a same or to different Node-Bs) in macrodiversity, and the received packets are recombined, at the RNC (Radio Network Controller) or Node-B level, so as to reduce the necessity of retransmissions, thanks to the gain achieved with macrodiversity. In order to simulate this functionality, macrodiversity is handled in a simplified way: the C// at the receiver of all the Node-Bs to which the UE sends packets in soft-handover is evaluated (if in the generic Node-B more than cell to which the UE is connected in macrodiversity is present, the C// at that Node-B is calculated as the sum of the C// of each cell in macrodiversity, under the assumption that the packet received by different cells is recombined before the demodulation), and the best C// among those calculated is selected (this corresponding to the assumption that, at the RNC—Radio Network Controller-level, the selected data packet is that which has been received with the higher C//). The selected C//, converted into Ec/N0, is then exploited to calculate the value of TBSize based on the curves provided by the link simulator, as described above. The packet is then sent to all the Node-Bs, but it will be forwarded to the RNC only by the Node-B having the highest C//, while in the remaining Node-Bs the packet reception is used only for scheduling the transmission of acknowledgments for the HARQ over the related E-HICH (E-DCH HARQ Acknowledgement Indicator Channel).

The present invention has been here described making reference to two exemplary embodiments thereof, relating to a HSDPA and a HSUPA systems. However, it should be understood that the applicability of the invention is not limited to the presented examples, being in general applicable to any system that envisages a retransmission protocol at the physical level, like for example EGPRS systems.

Also, the use of curves that link the throughput to interferential conditions for adapting the simulated transmission to the channel conditions can be exploited in the simulation of any system which envisages a selection of the transmission formats based on the instantaneous channel conditions experienced by the receiver.

The present invention may be implemented in hardware, in software, or partly in hardware and partly in software. For the implementation in software, a suitably programmed data processing system, e.g. a computer system or system of computers may be used. The computer or computer system may comprise a processor, Random Access Memory (RAM), and a memory storing a computer program that when executed by the processor causes the computer to perform the simulation described herein.

Several modifications to the described embodiments are possible, as well as other embodiments.

For example, the value of the SNR used by the simulator can be a preset value, i.e. an input configuration parameter for the simulator, in this way avoiding the need of estimating the SNR at each transmission (a fixed SNR value is used throughout the whole simulation, such fixed SNR being for example a value adapted to represent the average behaviour of the system).

Thanks to the present invention, the complexity of the simulator, and the simulation time are greatly reduced.

The invention claimed is:

1. A method of simulating transmission of data from a transmitter to a receiver in a radio communications network by a system comprising a first memory, a processor, and a second memory storing instructions that when executed cause the processor to manage allocation of the memory for simulating transmission of data, the method comprising:

determining a simulated data transmission throughput from a link-level simulation of a link between the transmitter and the receiver accounting for retransmission of data based on an interferential condition estimated to be experienced at the receiver in a first transmission time interval;

calculating, by the system, an average amount of data to be transmitted to the receiver in a considered transmission time interval occurring after the first transmission time interval based on the simulated data transmission throughput; and simulating, by the system, transmission of a packet data unit based on the calculated average amount of data to be transmitted to the receiver in the considered transmission time interval.

2. The method of claim 1, comprising determining a transmission power available for transmission at the transmitter, and using said estimated interferential condition and the determined transmission power to calculate a SNR or an Ec/N0 experienced at the receiver.

3. The method of claim 2, comprising determining a number of transmission channels available for transmitting data from the transmitter to the receiver, and wherein determining the simulated data transmission throughput comprises: based on the determined number of transmission channels, selecting one curve among a family of curves linking the SNR or the Ec/N0 experienced at the receiver to a data throughput corresponding to the SNR or the Ec/N0 experienced at the receiver, said curves being determined by the link-level simulation of the link between the transmitter and the receiver.

4. The method of claim 3, wherein determining the simulated data transmission throughput comprises: deriving the data throughput based on the selected curve and the calculated SNR or Ec/NO experienced at the receiver.

5. The method of claim 4, comprising composing the packet data unit to be transmitted in the considered transmission time interval, the packet data unit containing the calculated average amount of data.

6. The method of claim 3, further comprising: determining the number of transmission channels available for transmitting data from the transmitter to the receiver abased on a channel quality indicator of the receiver and a category of the receiver.

7. The method of claim 6, wherein the category of the receiver comprises a configuration parameter for a system-level simulator.

8. The method of claim 1, wherein the retransmission of data comprises Hybrid Automatic Retransmission Request (HARQ) retransmissions.

9. The method of claim 1, wherein determining the simulated data transmission throughput comprises: determining the simulated data transmission throughput based on the interferential condition estimated to be experienced at the receiver in the first transmission time interval and a number of transmission channels available for transmitting data from the transmitter to the receiver in the considered transmission time interval.

10. A system for simulating transmission of data from a transmitter to a receiver in a radio communications network, the system comprising:
a first memory;
at least one computing device comprising a processor and a second memory storing a computer program that when executed by the processor causes the at least one computing device to manage allocation of the first memory for simulating transmission of data and to:
determine a simulated data transmission throughput from a link-level simulation of a link between the transmitter and the receiver accounting for retransmission of data based on an interferential condition estimated to be experienced at the receiver in a first transmission time interval;
calculate an average amount of data to be transmitted to the receiver in a considered transmission time interval occurring after the first transmission time interval based on the simulated data transmission throughput; and
simulate transmission of a packet data unit based on the calculated average amount of data to be transmitted to the receiver in the considered transmission time interval.

11. The system of claim 10, wherein simulating transmission of the packet data unit comprises:
compose the packet data unit to be transmitted in the considered transmission time interval, the packet data unit containing the calculated average amount of data, and
simulate transmission of the composed packet data unit.

12. The system of claim 10, wherein the retransmission of data comprises Hybrid Automatic Retransmission Request (HARQ) retransmissions.

13. A non-transitory computer readable medium having a computer program stored thereon that when executed by a processor performs:
determining a simulated data transmission throughput from a link-level simulation of a link between a transmitter and a receiver accounting for retransmission of data based on an interferential condition estimated to be experienced at the receiver in a first transmission time interval;
calculating an average amount of data to be transmitted to a receiver in a considered transmission time interval occurring after the first transmission time interval based on the simulated data transmission throughput;
simulating transmission of a packet data unit based on the calculated average amount of data to be transmitted to the receiver in the considered transmission time interval; and
causing management of allocation of a memory for simulating transmission of data.

14. The non-transitory computer readable medium of claim 13, wherein simulating transmission of the packet data unit comprises:
composing the packet data unit to be transmitted in the considered transmission time interval, the packet data unit containing the calculated average amount of data, and
simulating transmission of the composed packet data unit.

15. The non-transitory computer readable medium of claim 13, wherein the retransmission of data comprises Hybrid Automatic Retransmission Request (HARQ) retransmissions.

* * * * *